United States Patent [19]

Spitznas et al.

[11] Patent Number: 4,710,000

[45] Date of Patent: Dec. 1, 1987

[54] SURGICAL STEREOMICROSCOPE

[75] Inventors: Manfred Spitznas, Bonn; Josef Reiner, Rodenkirchen; Wolfgang Veit, Solms; Rainer Kirchhuebel, Asslar, all of Fed. Rep. of Germany

[73] Assignee: Oculus Optikgeraete GmbH, Wetzlar, Fed. Rep. of Germany

[21] Appl. No.: 834,943

[22] Filed: Feb. 28, 1986

[30] Foreign Application Priority Data

Mar. 2, 1985 [DE] Fed. Rep. of Germany ....... 3507458

[51] Int. Cl.[4] .......................... G02B 21/22; A61B 3/10

[52] U.S. Cl. ...................................... 350/516; 351/205

[58] Field of Search ............... 350/286, 287, 511, 514, 350/515, 516, 520, 569; 351/205

[56] References Cited

U.S. PATENT DOCUMENTS 2,119,545 6/1938 Kaspereit ............................ 350/286

3,405,990 10/1968 Nothnagle et al. ................. 350/515

*Primary Examiner*—Bruce Y. Arnold

*Assistant Examiner*—Vincent J. Lemmo

*Attorney, Agent, or Firm*—Flynn, Thiel, Boutell & Tanis

[57] ABSTRACT

A stereomicroscope for use in performing surgeries, in particular eye surgeries, which has a collecting lens common to both beam paths and has for each beam path an objective and an ocular tube with two reversing prisms with adjustable interocular distance, which ocular tubes form a telescope. In order to produce, at an angled beam path with the help of the panorama funduscopy, an upright and unreversed image, between the objective (7) and the ocular tubes (11, 12) which contain the telescope is provided a double-refracting, reflecting system (4, 19, 20) which delivers a turned, unreflected image and covers both beam paths, which system is arranged in the stereomicroscope so that same can be exchanged with a 90° prism which is constructed with the same optical path length and covers both beam paths.

5 Claims, 9 Drawing Figures

11
12
11,12
1
1
19
16
16
16
19,20
20
8
10
9
8,9
10
6
6
7
7
2
2
3
3

SURGICAL STEREOMICROSCOPE

FIELD OF THE INVENTION

The invention relates to a stereomicroscope for carrying out surgeries, in particular eye surgeries, comprising a collecting lens which is common for both beam paths, an objective lens for each beam path, an ocular tube forming a telescope, and two reversing prisms with adjustable interocular distance.

BACKGROUND OF THE INVENTION

Stereomicroscopes of the abovementioned type are known and are utilized for eye surgeries. In order for the vitreous body space inside of the eye to become visible, a dispersing lens (contact lens) is placed onto the cornea. A reflection-free illumination is achieved by separating the observation and the illumination beam path, by illuminating the vitreous body space by a cold-light conductor which is applied from the side to the eye. With the help of such stereomicroscopes and a surgery technique which has been developed within the last decade, it is possible by using the finest instruments to remove opacities in the eye (vitrectomy). The eye has the structure of a hollow sphere. Its interior, the so-called vitreous body space, is usually filled with a transparent, jellylike mass, the vitreous body. The cornea and the lens, which together with the iris (diaphragm) form the optical system of the eye, lie in front of the vitreous body. The objects which lie in front of the eye are reproduced onto the retina which lies behind the vitreous body through the optical system. If opaque foreign particles (for example blood) penetrate the vitreous body space, same becomes opaque, so that the incident rays can no longer reach the retina. In spite of a full functioning of the optical system and of the retina, such eyes are practically blind.

With the help of vitrectomy, it is possible to eliminate such injuries. Of course, the contact lenses which have been used up to now deliver a view of approximately 20° (plano-concave contact lenses) up to a maximum of 35° (biconcave contact lenses).

It is optically possible to extend the visual-field angle to up to 150°, which would make surgery substantially easier. Such a system of contact optics and spherical lens is known from the panorama funduscopy. Such a device is marketed by the Firm Rondenstock of Muenchen under the Trademark "Panfunduskop".

However, it is not possible to use this advantage in the vitrectomy, since the image in the surgery microscope appears inverted and left-and-right reversed. Thus manipulations in the eye are dangerously difficult and bimanually impossible.

An ophthalmoscope is known from U.S. Pat. No. 4,015,898, with which the background of the eye can be viewed. It is suggested in this patent to insert an Uppendahl prism for the inverting, reversing and separating of the beams, through which a stereoscopical, upright, unreversed image of the retina can be observed. However, the use of an Uppendahl prism assumes that an observing of the eye occurs in a straight, nonbent beam path, that is the eye of the observer must always lie rectinlinearly above the surface which is to be viewed. Whereas a bent beam path exists in a stereomicroscope, that is, the observer looks obliquely into the stereomicroscope, which is absolutely necessary for surgeries on the eye, because alone through this is assured an effortless working and operating, since otherwise the position of the surgeon would be unnatural and, which makes it more difficult yet, the distance from the eye of the surgeon to the object which is to be treated becomes too great.

The basic purpose of the invention is to construct a stereomicroscope with a bent beam path of the abovementioned type such that the image which is obtained with the help of the panorama funduscopy appears upright and unreversed to the observer.

The beam path is parallel between the objective and the two prism telescopes, so that within certain limits the distance of said elements from one another can be changed without causing the beam path of the microscope to be significantly influenced with respect to the enlargement and the field of vision. The same is also true if, in addition, an enlargement changer is inserted between the collecting lens and the objective. It is possible through this to provide an optical element in said parallel beam path, which optical element places the image upright and unreversed and assures the bending of the beam path. It is not sufficient to carry out this upright positioning and unreversed positioning for each ocular separately, but to avoid a pseudostereoscopical effect, an exchange of the beam paths of the two microscope halves must also occur simultaneously. In order to obtain a turned, nonreflected image, the invention uses either a 90°-reflection prism with a roof-surface pair or, however, a system which is formed of two mirrors which are arranged and fixed angularly to one another. The beam path which comes from the objective is fed to said system and is correspondingly reflected, whereby the reflecting system is arranged such that the beam path is deflected at the desired angle needed for the special stereomicroscope, in particular for an ergonomical working of a surgery microscope. In order that work can be done also normally with an inventively constructed stereomicroscope, that is without the funduscopy lenses, and then too an upright, unreversed image is obtained, the additionally inserted double-refracting, reflecting system is exchanged with a 90° prism which again covers both beam paths and has the same optical path length as the double-refracting, reflecting system. This assures that during an exchanging of the reflecting systems, a new focusing of the stereomicroscope is not necessary. Such a capability of exchanging of the systems, which is carried out advantageously in a simple manner by arranging both systems on a common carriage, is necessary because especially during eye surgeries, a suitable reversal of the image is needed, depending on whether work is done in front of or behind the eye lens.

BRIEF DESCRIPTION OF THE DRAWINGS

One exemplary embodiment of the invention will be described in greater detail hereinbelow with reference to the drawings, in which.

DETAILED DESCRIPTION

Figure 1:
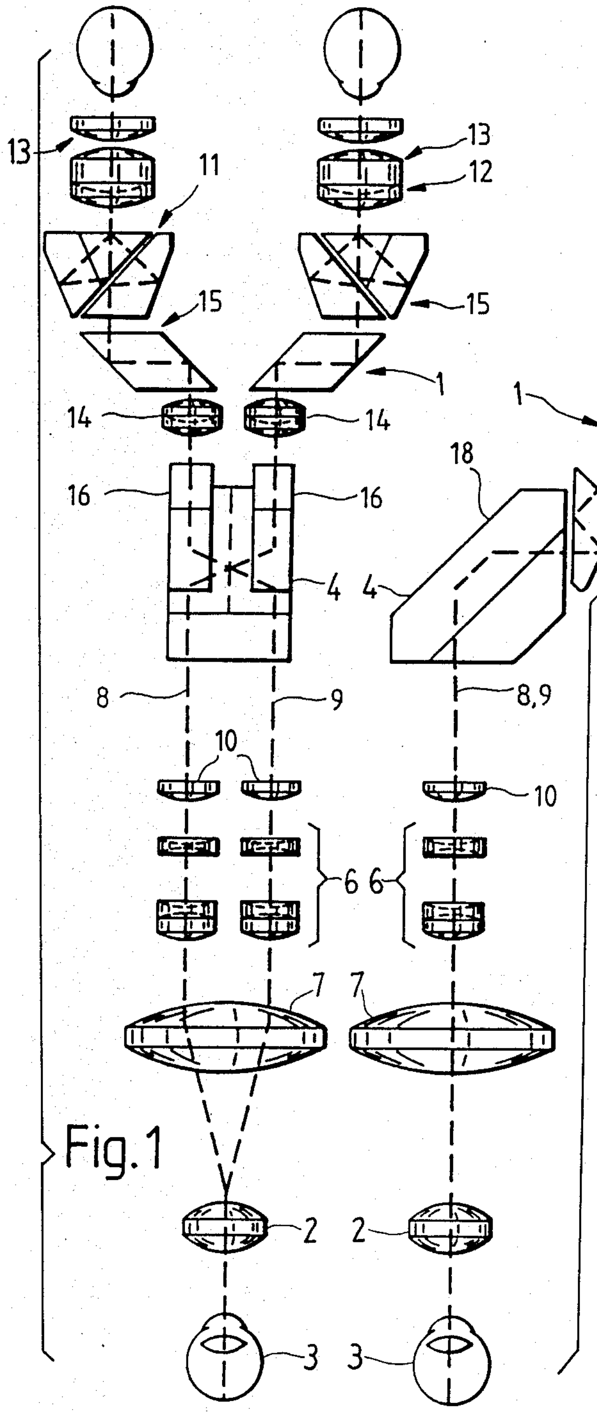
FIGS. 1 and 2 are a schematic front and side view of the structure of a stereomicroscope with a 90°-reflection prism which has been moved microscopically into the beam path.

The stereomicroscope is identified as a whole by reference numeral 1 in the figures. A spherical lens 2 is arranged under the microscope and forms together with a contact lens which is placed onto the eye 3 the funduscopy device. The visual-field angle of the stereomicroscope, which usually amount to up to 30°, is hereby increased to 150°, which means a considerably greater overall view during observations in the eye.

The stereomicroscope 1 has a conventional design but for the 90°-reflection prism 4 with a roof-surface pair, which prism is inserted into the parallel beam path of the microscope. The collecting lens of the stereomicroscope 1 is common to both beam paths 8, 9. An enlargement changer 6 is connected for each beam path following the collecting lens. The enlargement of the stereomicroscope 1 can be adjusted in a simple manner with said enlargement changer 6. The enlargement changer is of a conventional type and can be constructed as a movable changer. An objective lens 10 is connected in a conventional manner in each beam path 8, 9 following the enlargement changer 6. The two ocular tubes 11, 12 form a telescope system each with three lenses 13, 14, between which deflecting prisms 15, 16 are arranged. The design of the ocular tubes 11, 12 is of a common type.

Figure 2:
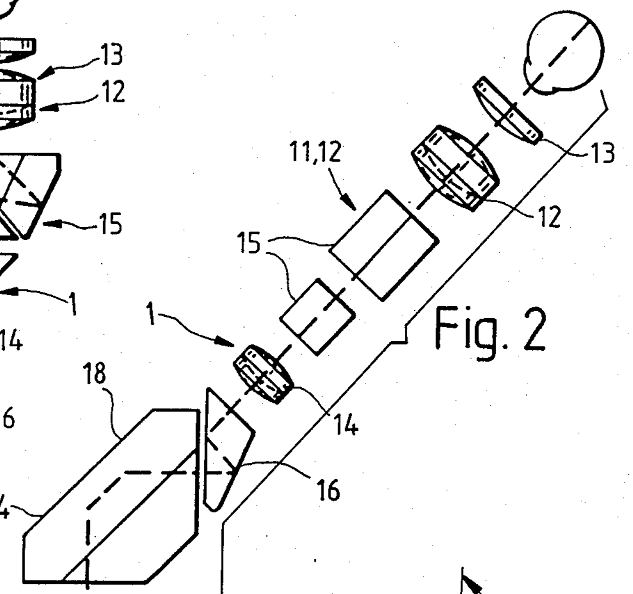
Figure 3:
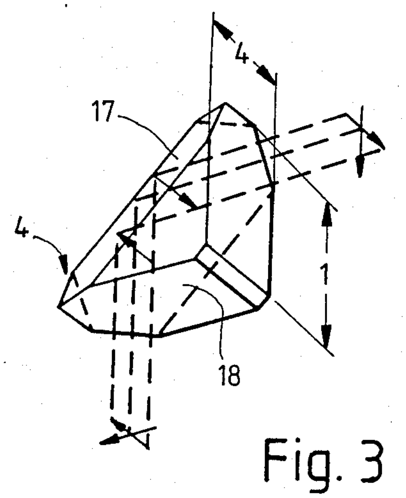
FIG. 3 is a perspective view of the 90°-reflection prism.

In the inventive stereomicroscope, compared with the common stereomicroscope, the distance between the enlargement changer 6 and the two ocular tubes 11, 12 was increased and the reflection prism 4 with its two roof surfaces 17, 18 according to FIG. 3 was inserted. This 90°-reflection prism results in a turned, nonreflected image, which is imaged into the ocular tubes 11, 12, which, as is shown in FIG. 2, are arranged at an angle with respect to the beam path 8, 9. This angle is absolutely necessary for stereomicroscopes which are used for surgery, since then only in an ergonomical respect surgery can be carried out in a satisfactory manner. The exchange of the prism 4 with another prism, which does not permit a beam deflection in a specific angle, cannot be used for the mentioned purpose.

Figures 4, 5:
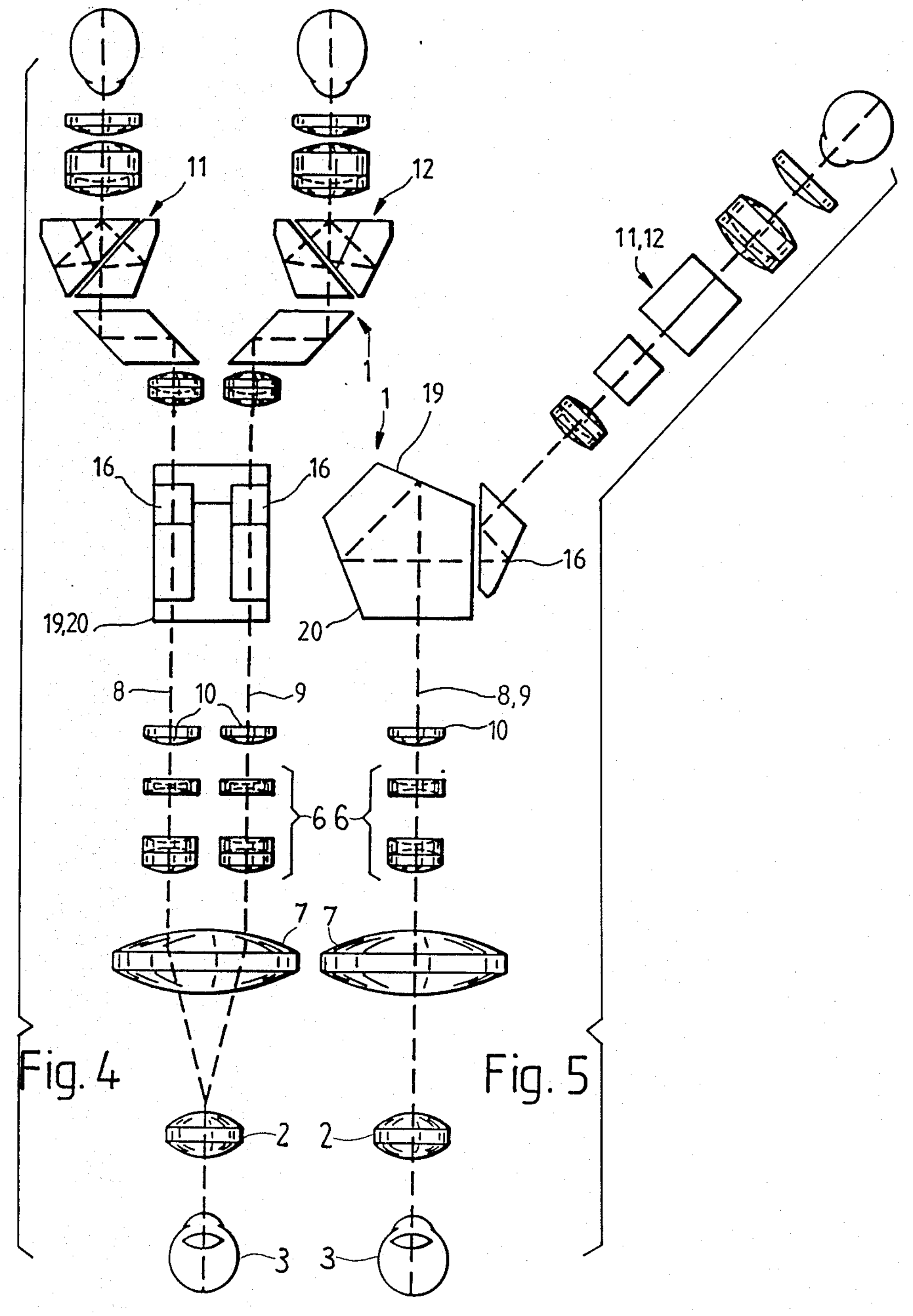
FIGS. 4 and 5 are a schematic front and side view of the beam path of a stereomicroscope with a reflecting system of two mirrors arranged angularly to one another, which system is moved into the beam path.
Figure 6:
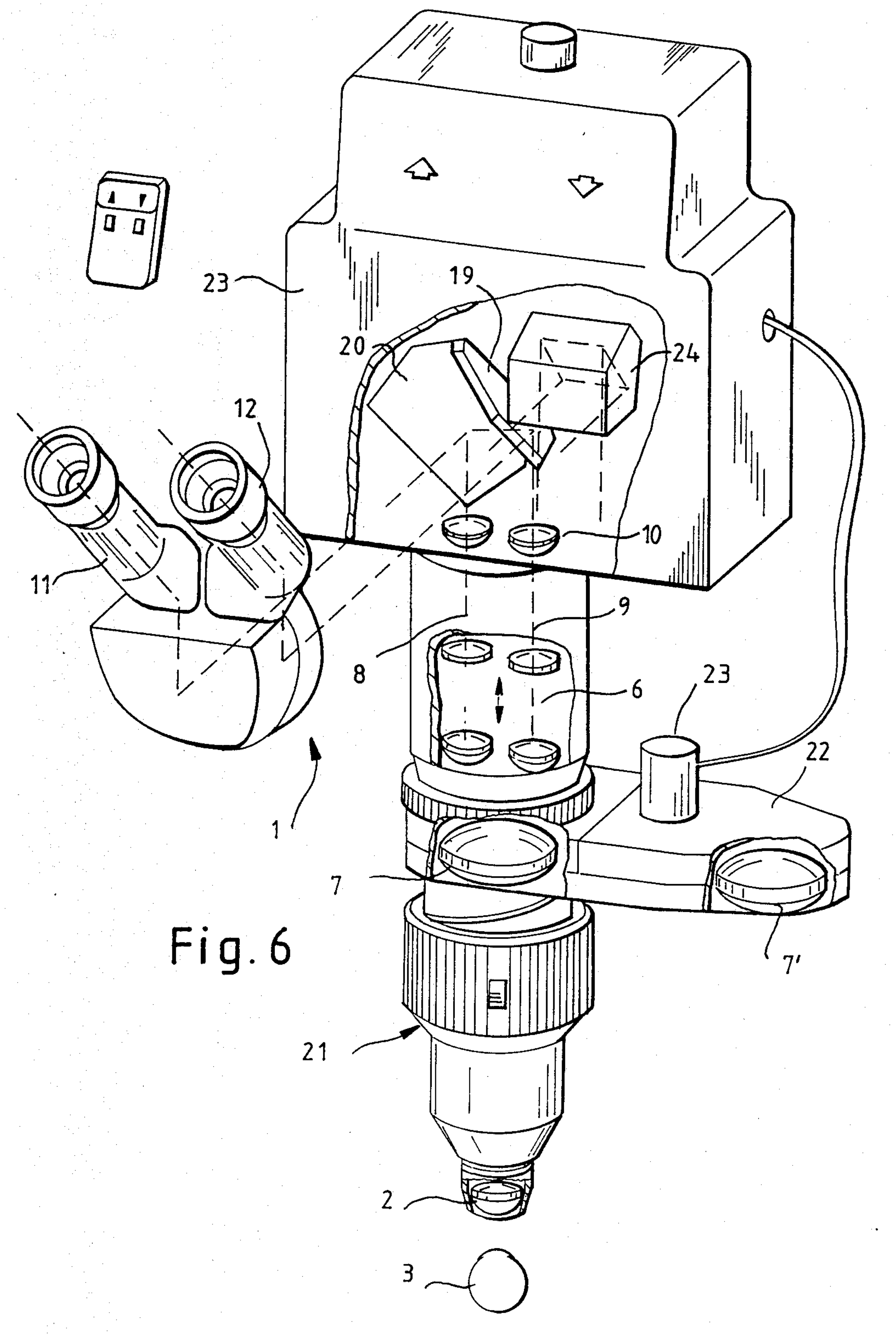
FIG. 6 illustrates perspectively an inventive stereomicroscope corresponding with the structure according to FIGS. 4 and 5.

FIGS. 4 and 5 illustrate the same stereomicroscope in a front and side view, whereby its basic design corresponds with the one of the stereomicroscope according to FIGS. 1 and 2. The same parts are here identified by the same reference numerals. The difference, compared with the exemplary embodiment according to FIGS. 1 and 2, consists in that here, in place of a 90°-reflection prism with roof edges, two mirrors 19, 20 are connected into the beam path 8, 9 to deliver the requested turned, unreflected image, which is then introducted into the ocular tubes 11, 12 which in turn are arranged at an angle with respect to the beam path 8, 9. This stereomicroscope functions in the same manner as the one which has been described in connection with FIGS. 1 and 2. FIG. 6 illustrates schematically and perspectively a stereomicroscope corresponding with FIGS. 4 and 5. The same parts in this stereomicroscope are identified by the same reference numerals. The difference compared with the principle sketch according to FIGS. 3 and 4 consists in the collecting lens 7 and the lens 2 being arranged in a housing 21 which, on the one hand, permits a movement of the lens 2 relative to the collecting lens 7 and, on the other hand, is secured on a carrier 22 which is pivotal about an axis so that the wide-angle device 21 can be exchanged through a simple swivelling during nonuse with the collecting lens 7 which is needed for viewing the eye foreground.

Figure 9:
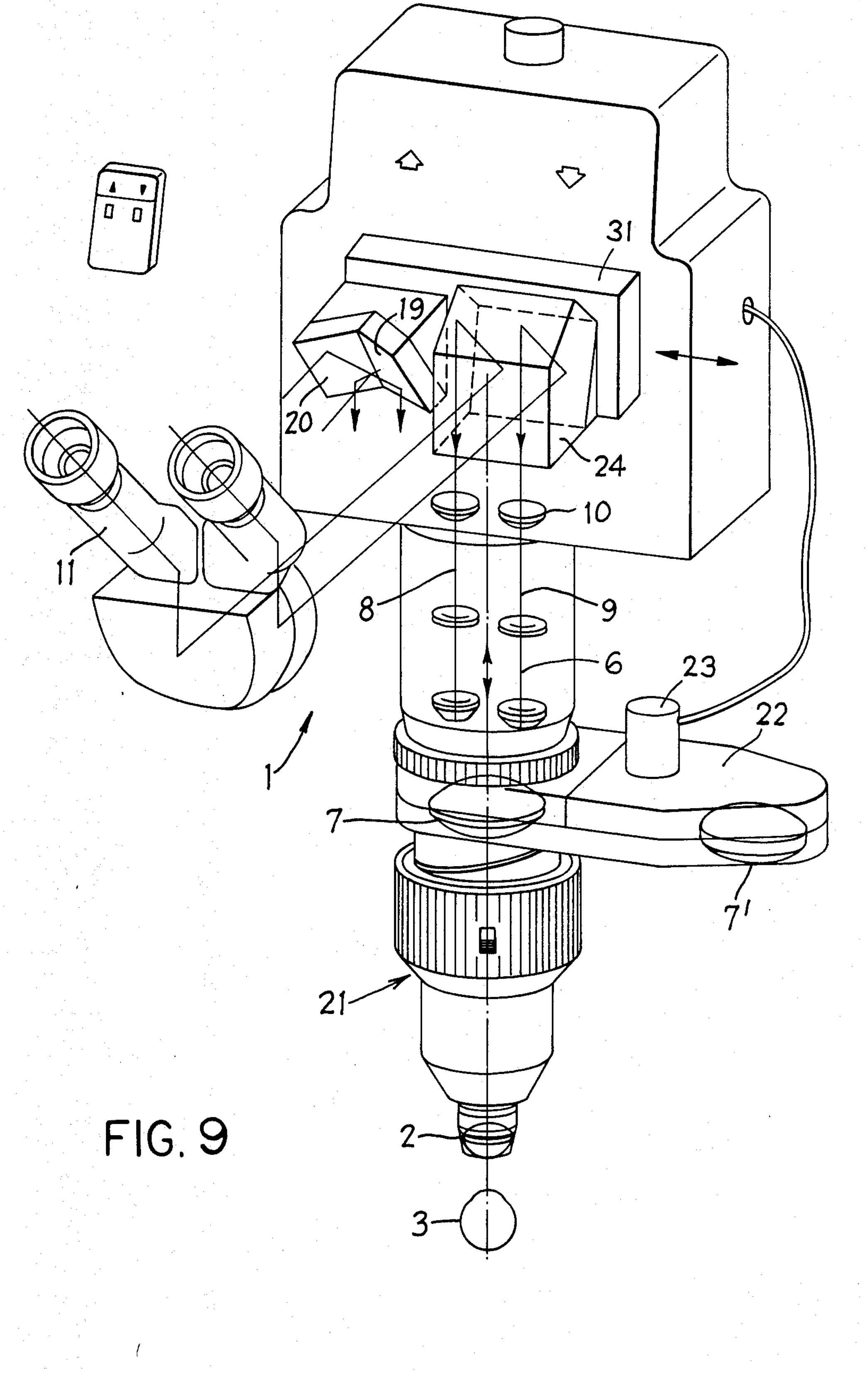
FIG. 9 is a view similar to FIG. 6 but showing a carriage on which is mounted two mirror systems.

The double-refracting mirror system 19, 20, is arranged in the housing 23 of the stereomicroscope. As shown in FIG. 9 the double-refracting mirror system 19, 20 is mounted on a carriage 31 together with a pentagonal prism 24, which is adapted so to the mirror system 19, 20 that the beams 8, 9 in the mirror system 19, 20 and also in the pentagonal prism 24 cover the same optical path. If the stereomicroscope is not used for surgery of the eye background but for other surgeries or, however, for operations in front of the lens of the eye, then, in order to obtain an upright image, the mirror system 19, 20 is moved out of the beam path 8, 9 and the pentagonal prism is moved to the place of the mirror system 19, 20. This change must often be carried out during eye surgeries, since the surgery first takes place at the eye periphery and only then surgery takes places at the eye background. Due to the fact that both the pentagonal prism 23 and also the mirror system 19, 20 and also the 90°-reflection prism with roof-surface pair 17, 18 have the same optical path, it is assured during an exchange of the mirror systems that the image obtained is immediately again in focus, so that adjusting operations for focusing are not needed.

Figures 7, 8:
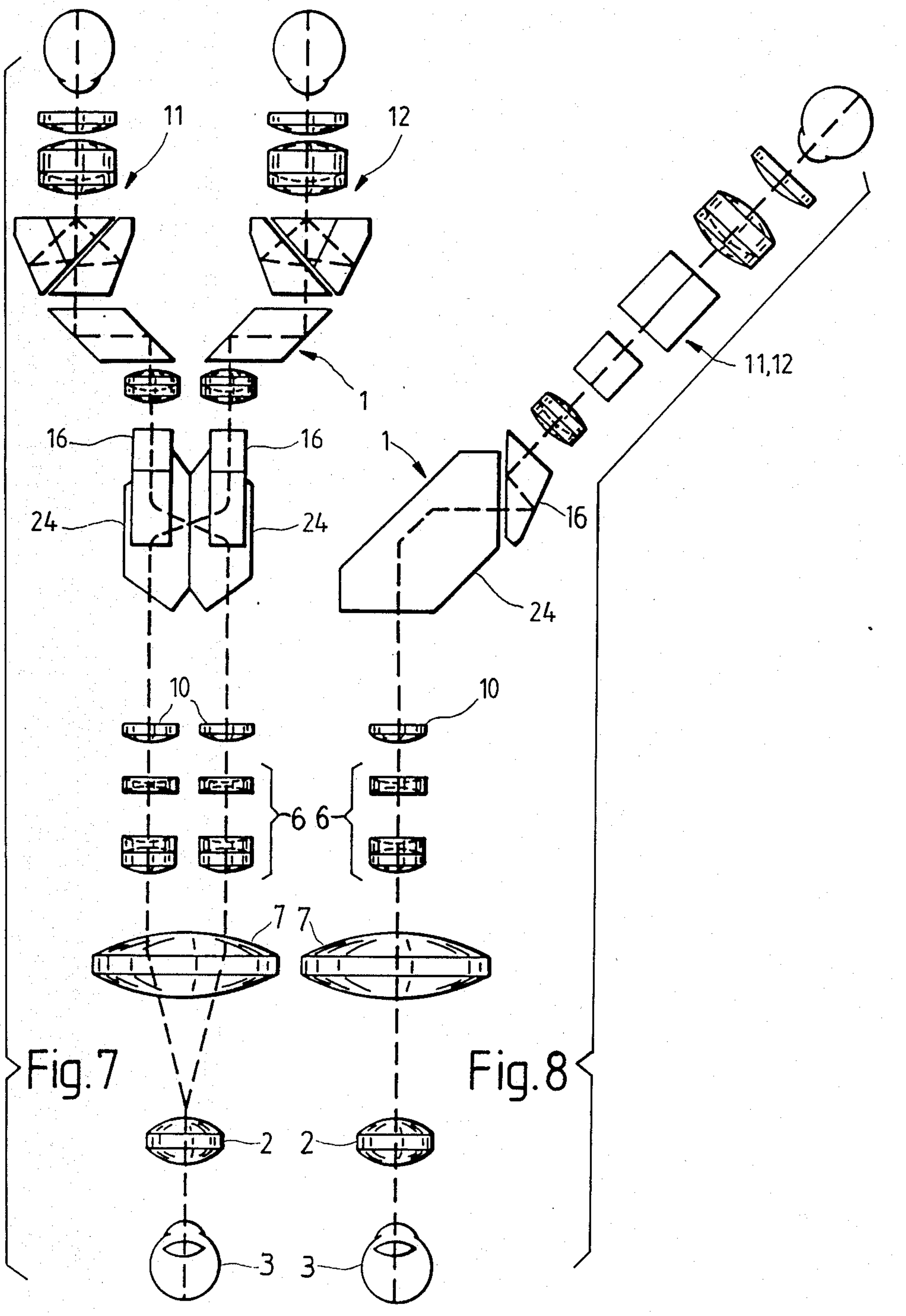
FIGS. 7 and 8 are a front view and a side view of the beam path of the inventively constructed stereomicroscope according to FIGS. 1 to 6 with a reflection prism replacing the reflecting system.

FIGS. 7 and 8, which show a stereomicroscope corresponding with FIGS. 1 and 2 or FIGS. 4 to 6, illustrate the schematic structure of the stereomicroscope and the beam path after the pentagonal prism 24 has been moved into the beam path.

The embodiments of the invention in which an exclusive property or privilege is claimed are defined as follows:

1. In a stereomicroscope for use in performing surgeries, in particular eye surgeries, comprising a collecting lens which is common to both beam paths and an objective lens for each beam path, an ocular tube for each beam path forming a telescope having two reversing prisms with adjustable interocular distance, the improvement comprising wherein between said objective lens and said ocular tubes which contain the telescopes there is inserted a double-refracting, reflecting system which delivers a turned, unreflected image and covers both beam paths, and wherein said reflecting system is arranged in such a manner in the stereomicroscope, that said reflecting system can be exchanged with a 90° prism which is constructed with the same optical path length and covers both beam paths.

2. A stereomicroscope according to claim 1, wherein said reflecting system is a 90° reflection prism with two roofsurfaces.

3. A stereomicroscope according to claim 1, wherein said reflecting system consists of two mirrors which are arranged angularly to one another and are fixed.

4. A stereomicroscope according to claim 3, wherein said reflecting system and the 90° prism are arranged on a common carriage which is movably supported in the stereomicroscope.

5. A stereomicroscope according to claim 1, wherein an enlargement changer is inserted between said collecting lens and said objective lens.

* * * * *